(12) United States Patent
Goto et al.

(10) Patent No.: US 11,845,471 B2
(45) Date of Patent: Dec. 19, 2023

(54) TRAVEL ASSISTANCE METHOD AND TRAVEL ASSISTANCE DEVICE

(71) Applicant: Nissan Motor Co., Ltd., Yokohama (JP)

(72) Inventors: Akinobu Goto, Kanagawa (JP); Takashi Fukushige, Kanagawa (JP); Satoshi Tange, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 454 days.

(21) Appl. No.: 17/254,950

(22) PCT Filed: Jun. 29, 2018

(86) PCT No.: PCT/IB2018/000890
§ 371 (c)(1),
(2) Date: Dec. 22, 2020

(87) PCT Pub. No.: WO2020/002964
PCT Pub. Date: Jan. 2, 2020

(65) Prior Publication Data
US 2021/0155267 A1 May 27, 2021

(51) Int. Cl.
*B60W 60/00* (2020.01)
*B60W 40/105* (2012.01)

(52) U.S. Cl.
CPC ...... *B60W 60/0027* (2020.02); *B60W 40/105* (2013.01); *B60W 2554/4041* (2020.02);
(Continued)

(58) Field of Classification Search
None
See application file for complete search history.

(56) References Cited

U.S. PATENT DOCUMENTS

2018/0197414 A1\* 7/2018 Oooka ............... B62D 15/0265
2018/0281790 A1\* 10/2018 Oyama ................. B60W 40/10
(Continued)

FOREIGN PATENT DOCUMENTS

JP 2007-249407 A 9/2007
JP 2015-191553 A 11/2015
(Continued)

OTHER PUBLICATIONS

Machine translation of JP2017052411A (Year: 2023).\*

*Primary Examiner* — Aniss Chad
*Assistant Examiner* — Jennifer M Anda
(74) *Attorney, Agent, or Firm* — Young Basile Hanlon & MacFarlane, P.C.

(57) ABSTRACT

A travel support method for a vehicle comprises estimating a position of a subject vehicle, generating a subject vehicle traveling route, based on the estimated position of the subject vehicle and map information, calculating a degree of first reliability indicating reliability of the subject vehicle traveling route, detecting a preceding vehicle traveling ahead of the subject vehicle, generating a preceding vehicle traveling route, calculating a degree of second reliability indicating reliability of the preceding vehicle traveling route, based on the preceding vehicle traveling route, calculating, based on the degrees of the first reliability and second reliability, an integration ratio for integrating the subject vehicle traveling route and the preceding vehicle traveling route, calculating a target traveling route of the subject vehicle by integrating the subject vehicle traveling route and the preceding vehicle traveling route at the integration ratio, and controlling the subject vehicle based on the target traveling route.

20 Claims, 12 Drawing Sheets

Figure 1:
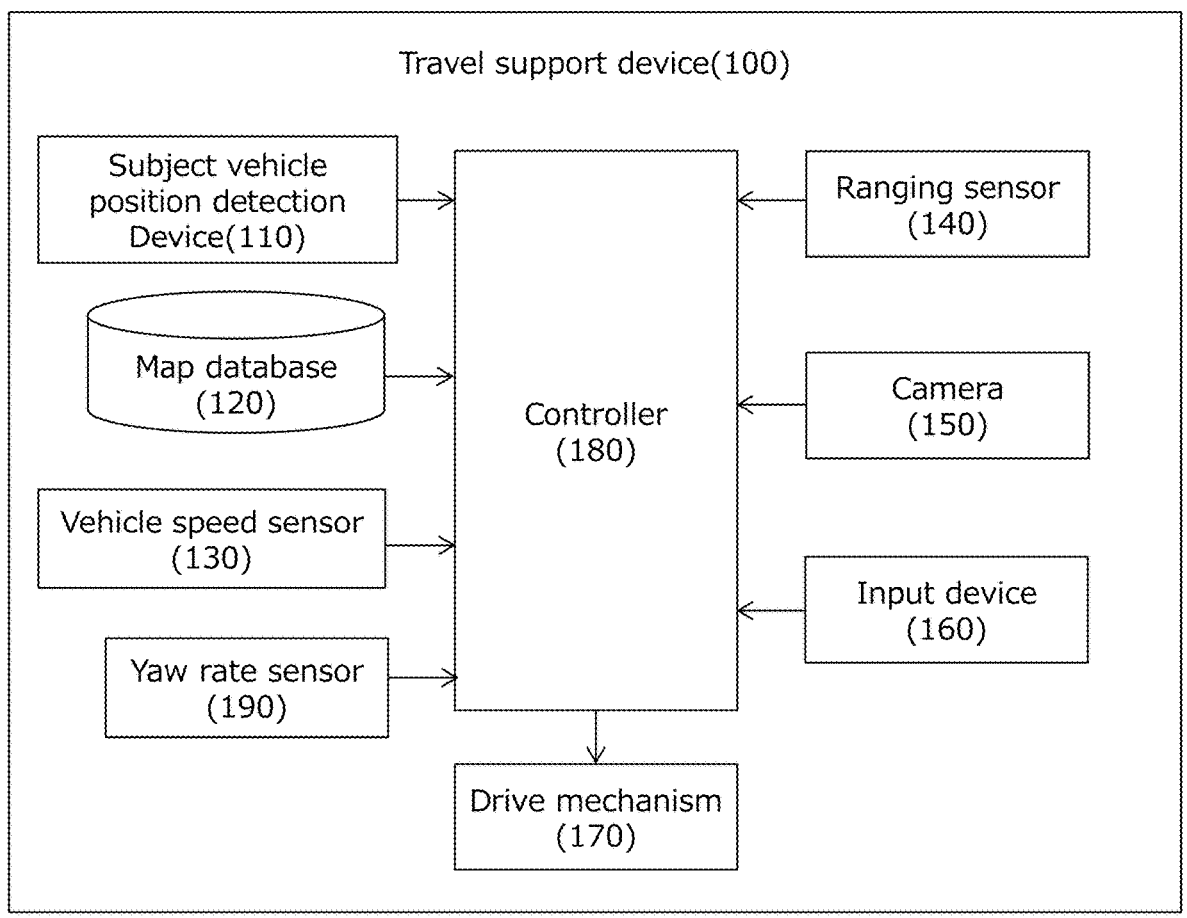

(52) U.S. Cl.
CPC ............... *B60W 2554/4044* (2020.02); *B60W 2554/801* (2020.02); *B60W 2556/45* (2020.02)

(56) References Cited

U.S. PATENT DOCUMENTS

| | | | |
|---|---|---|---|
| 2019/0031193 A1 | 1/2019 | Kojima | |
| 2019/0263402 A1 | 8/2019 | Tokimasa et al. | |
| 2020/0223449 A1* | 7/2020 | Tsuji | ................ G08G 1/096758 |
| 2020/0385018 A1* | 12/2020 | Kameoka | ............ B60W 30/045 |

FOREIGN PATENT DOCUMENTS

| | | | |
|---|---|---|---|
| JP | 2016-218737 A | | 12/2016 |
| JP | 2017-016403 A | | 1/2017 |
| JP | 2017-045356 A | | 3/2017 |
| JP | 2017-054296 A | | 3/2017 |
| JP | 2017052411 A | * | 3/2017 |
| JP | 2018-024345 A | | 2/2018 |
| JP | 2018-079848 A | | 5/2018 |
| WO | 2017/169021 A1 | | 10/2017 |

* cited by examiner

Fig. 11

| Subject vehicle traveling route | High | | Middle | | Low | |
|---|---|---|---|---|---|---|
| Degree of first reliability | | | | | | |
| Preceding vehicle traveling route Degree of Second reliability | High | Low | High | Low | High | Low |
| Subject vehicle traveling route Utilization ratio[%] | 100 | 100 | 50 | 100 | 0 | 0 |
| Preceding vehicle traveling route Utilization ratio [%] | 0 | 0 | 50 | 0 | 100 | 0 |
| | (a) | | (b) | | (c) | |

TRAVEL ASSISTANCE METHOD AND TRAVEL ASSISTANCE DEVICE

TECHNICAL FIELD

The present invention relates to the travel support method and the travel support device which controls travel of a Vehicle.

BACKGROUND

A traveling route generator centering the traveling route of a preceding vehicle, as known, sets a subject vehicle traveling area so that the lower the recognition likelihood of the preceding vehicle is, the larger the width of the area is, and generate a traveling route of a subject vehicle which passes within a overlapping range of a traveling area of the subject vehicle and a traveling area of the preceding vehicle (for example, JP-2015-191553 A).

SUMMARY

However, in the above prior art, for example, when the preceding vehicle changes courses with the high recognition likelihood of the preceding vehicle, the subject vehicle is unsteady by following the preceding vehicle.

The problem to be solved by the present invention is to provide a travel support method and a travel support device capable of suppressing an unsteadiness of the subject vehicle.

The present invention solves the above problems by generating a subject vehicle traveling route based on an estimated position of the subject vehicle and map information, calculating a degree of first reliability indicating reliability of the subject vehicle traveling route, detecting a preceding vehicle using the on-board sensor, generating a preceding vehicle traveling route, calculating a degree of second reliability indicating reliability of the preceding vehicle traveling route based on a shape of the preceding vehicle traveling route, calculating a integration ratio for integrating the subject vehicle traveling route and the preceding vehicle traveling route based on the degree of the first reliability and the degree of the second reliability, and integrating the subject vehicle traveling route and the preceding vehicle traveling route at an integration ratio, calculating a target traveling route of the subject vehicle, and controlling the subject vehicle based on the target traveling route.

According to the present invention, it is possible to recognize the difference between the traveling route of the preceding vehicle and the traveling route of the subject vehicle, it is possible to suppress the unsteadiness of the subject vehicle by following the preceding vehicle.

BRIEF DESCRIPTION OF THE DRAWING(S)

Figure 2:
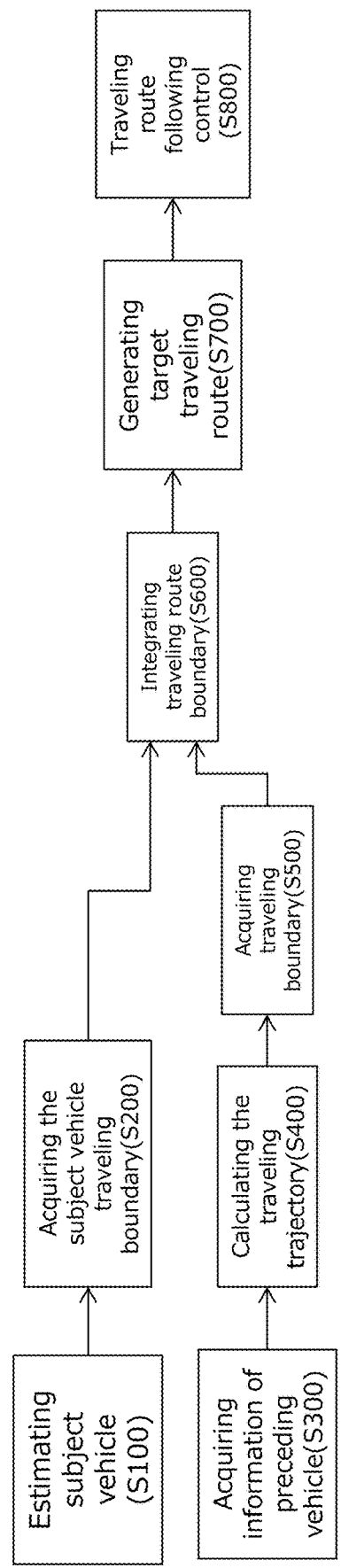
Figure 3:
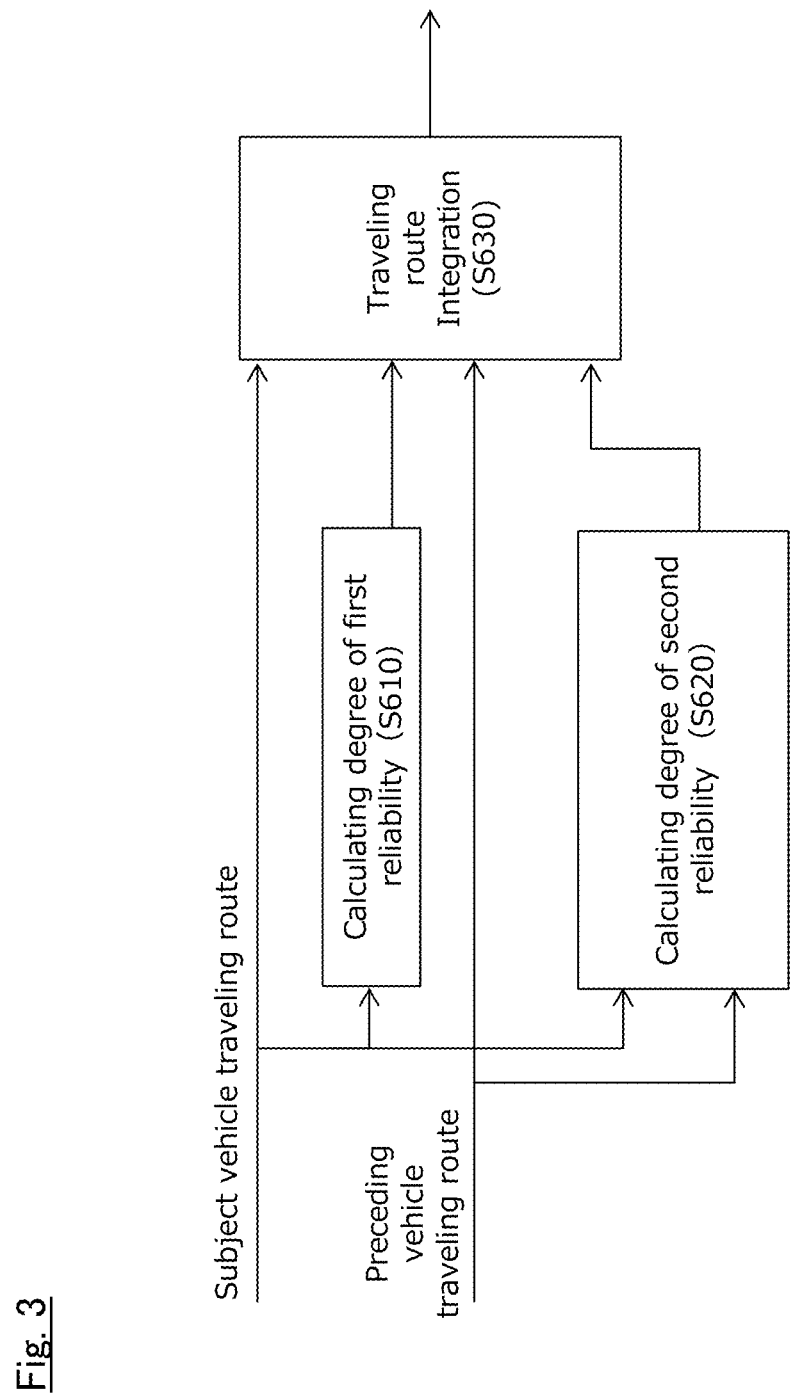
Figure 4:
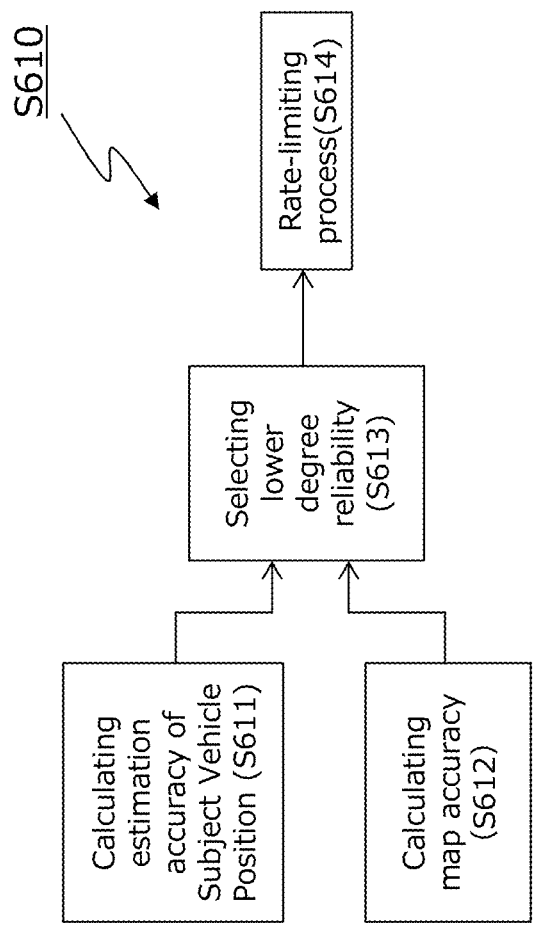
Figure 5:
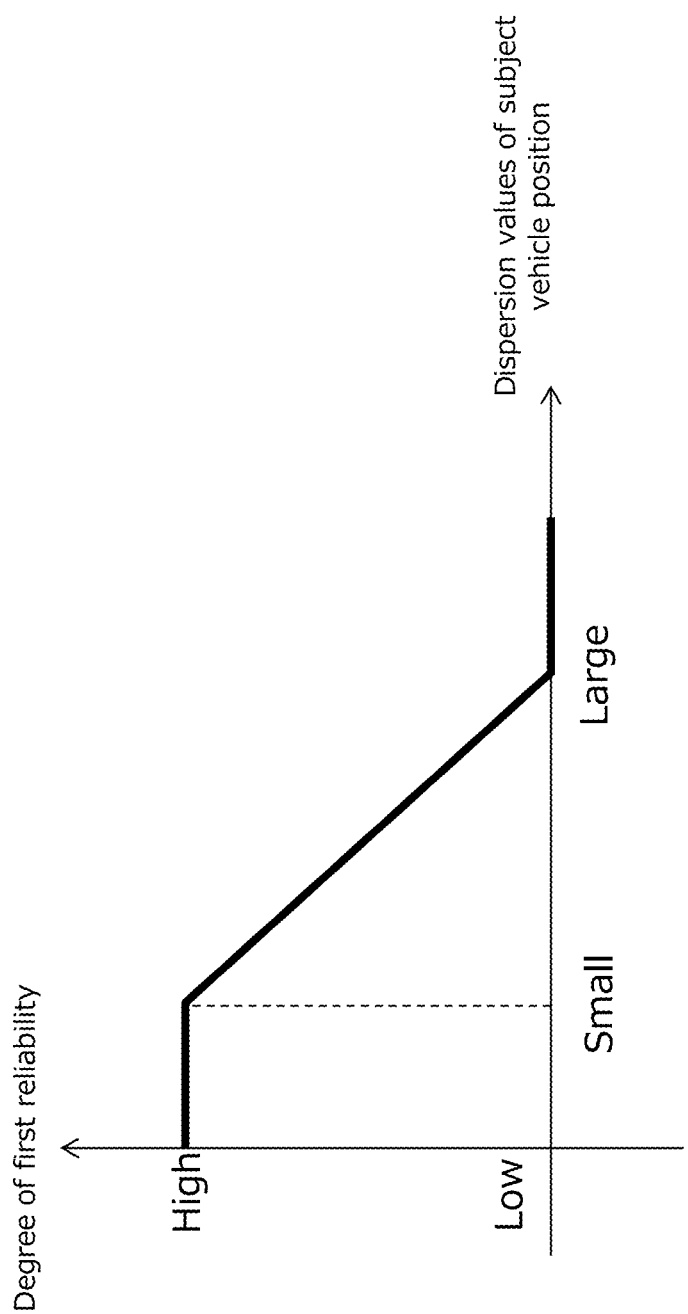
Figure 6:
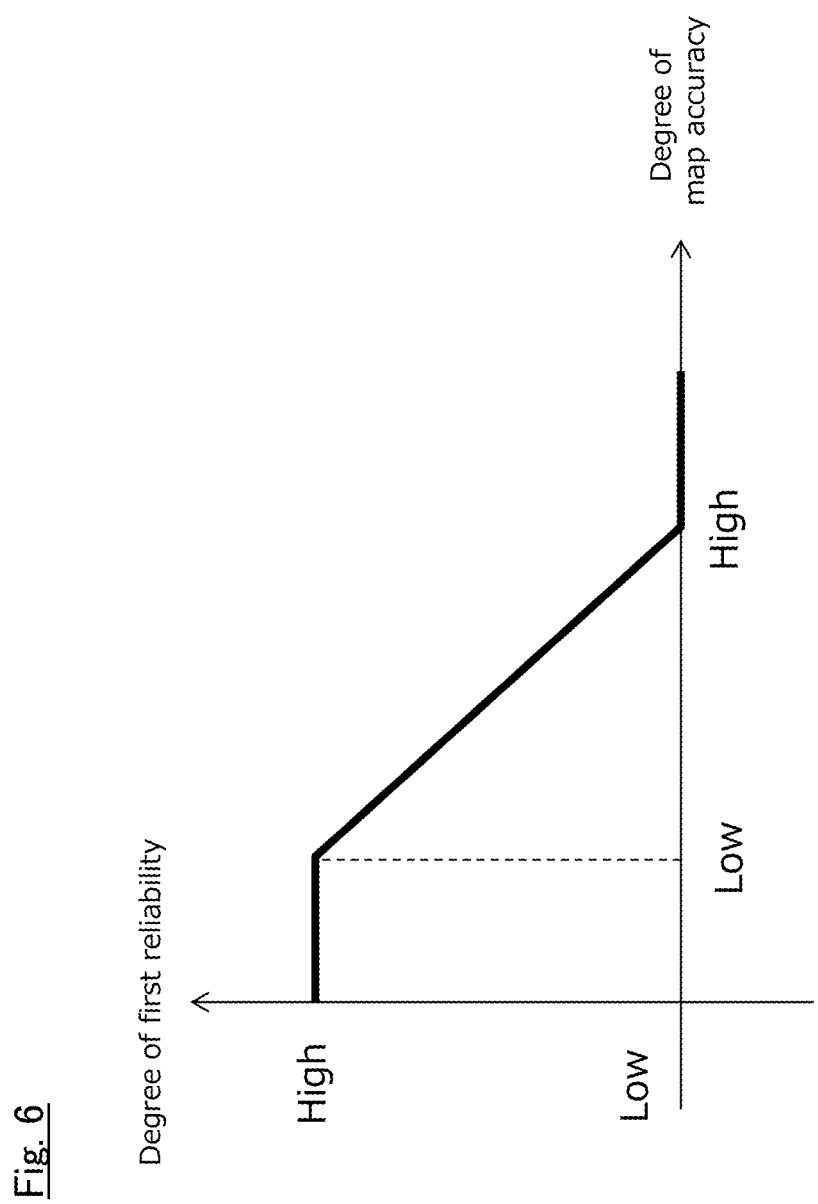
Figure 7:
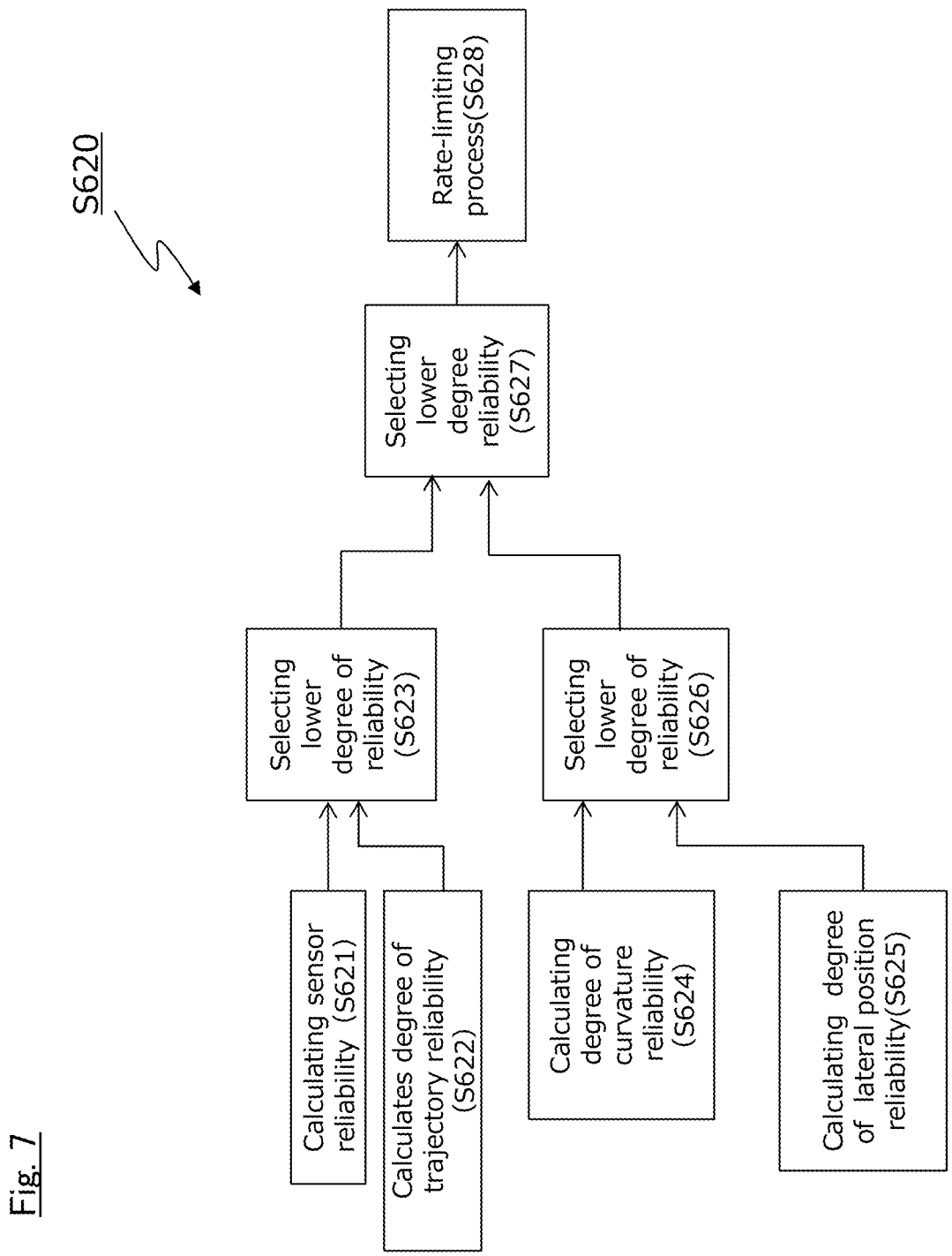
Figure 8:
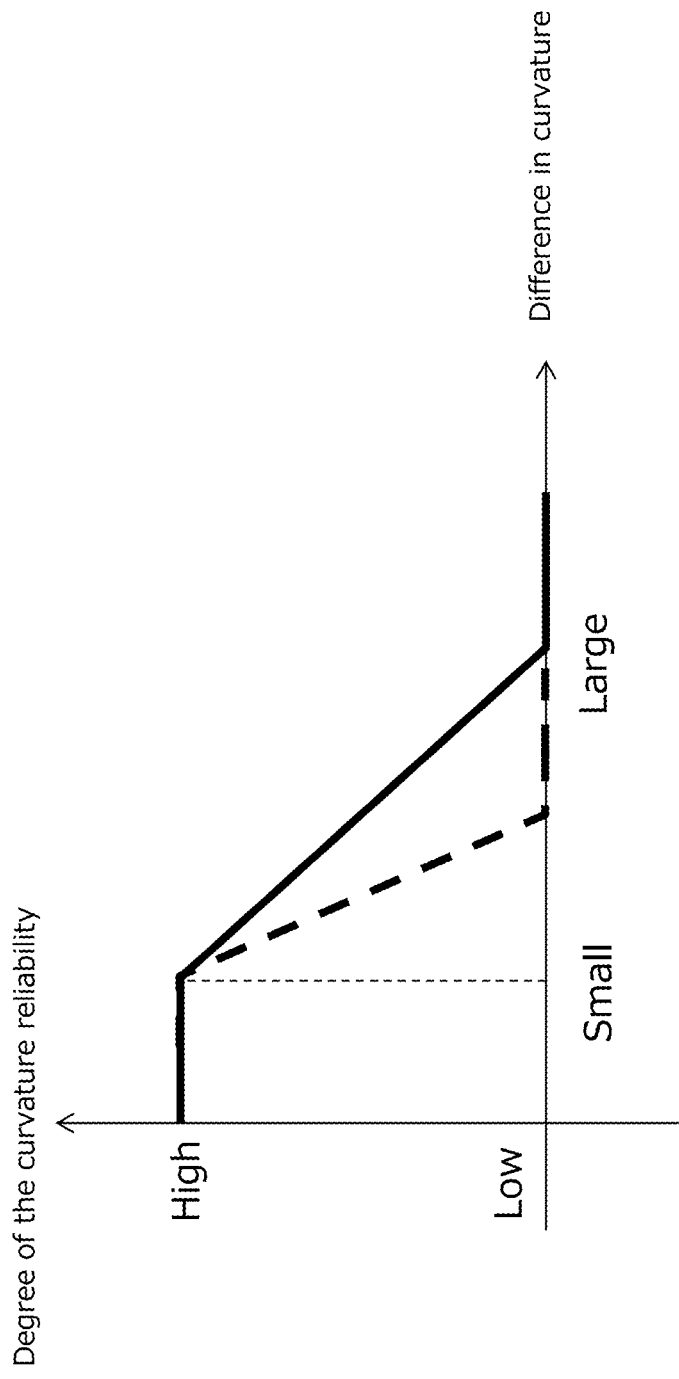
Figure 9:
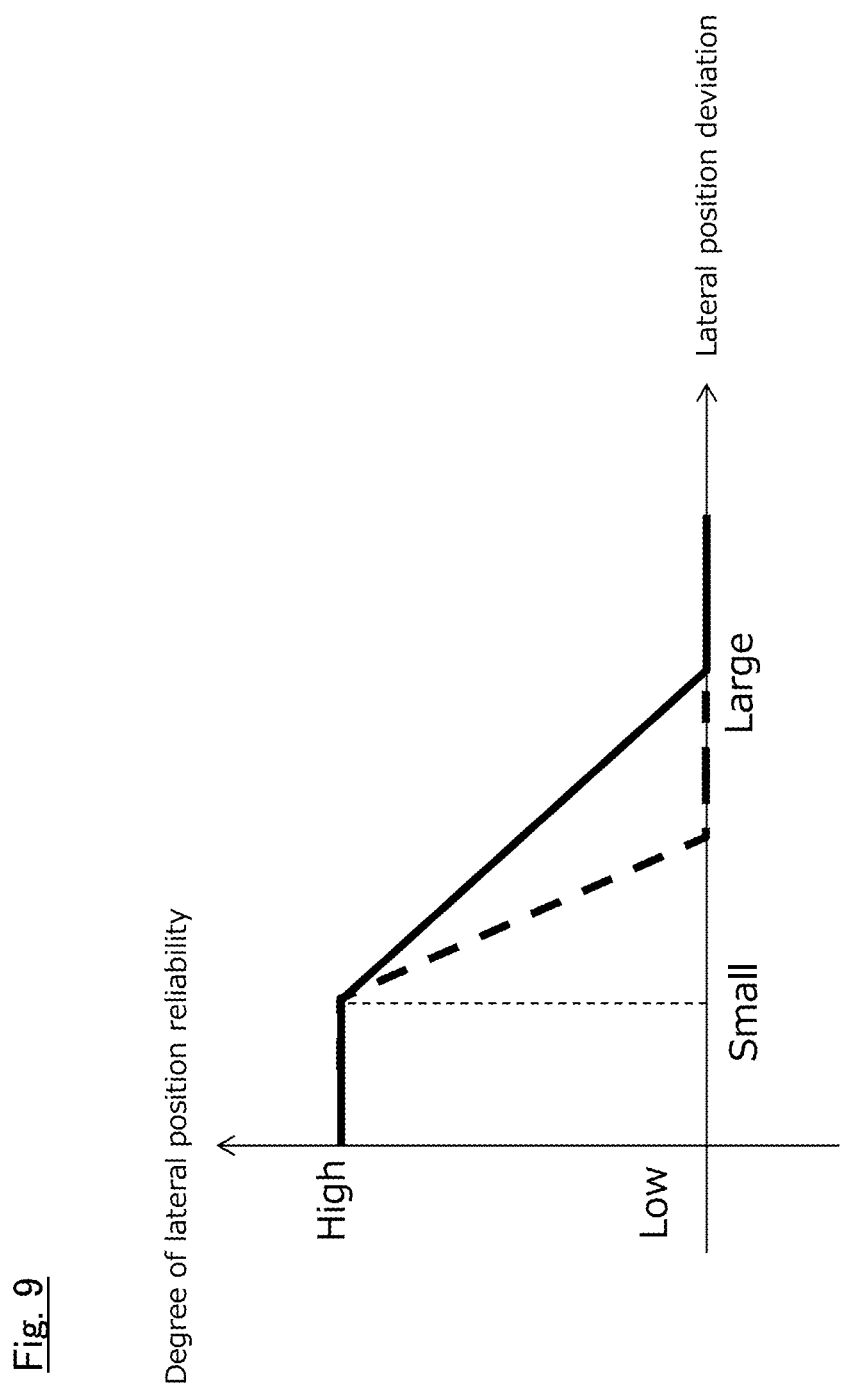
Figure 10:
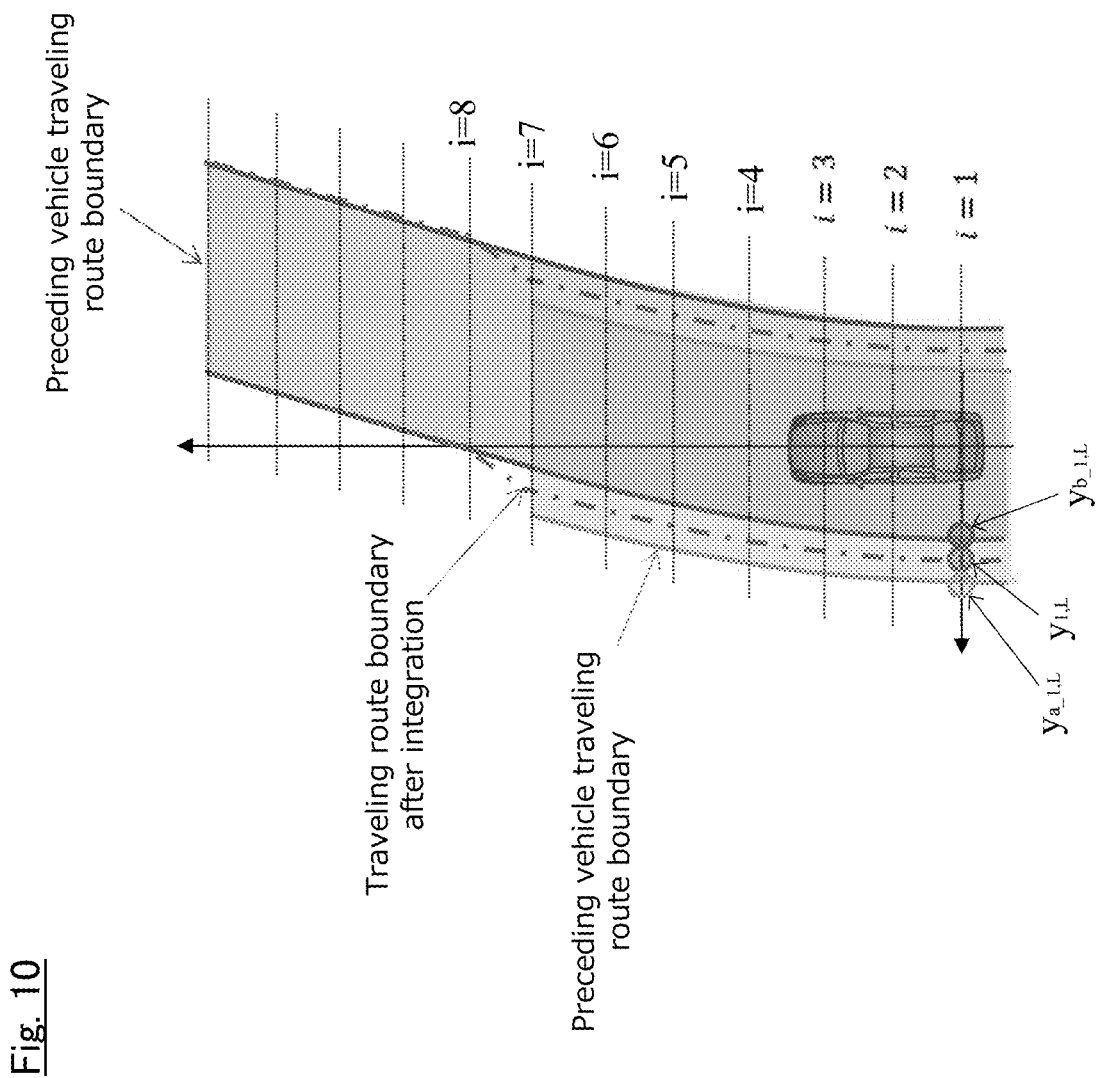

FIG. 1 is a block diagram showing a travel support device according to an embodiment of the present invention;
FIG. 2 is a block diagram illustrating flowcharts of a travel support process in the controller of FIG. 1;
FIG. 3 is a block diagram illustrating flowcharts of the control process (step S600) of FIG. 2;
FIG. 4 is a block diagram for explaining flowcharts of the control process (step S610) of FIG. 3;
FIG. 5 is a graph showing the relationship between a dispersion value of the subject vehicle position and a degree of the first reliability;
FIG. 6 is a graph showing a relationship between a degree of map accuracy and a degree of first reliability;
FIG. 7 is a block diagram for explaining flowcharts of the control process (step S620) of FIG. 3;
FIG. 8 is a graph showing a relationship between a difference in the curvature and a degree of curvature reliability;
FIG. 9 is a graph showing a relationship between a lateral position deviation and a degree of lateral position reliability;
FIG. 10 is a diagram for explaining a traveling route boundary after integration to be calculated by the control process (step S600) of FIG. 2;
FIG. 11 is a diagram illustrating a utilization ratio of the subject vehicle traveling route and the preceding vehicle traveling route for the degree of the first reliability and the degree of the second reliability; and
FIGS. 12($a$)-12($c$) are diagrams illustrating the relationship between the utilization ratio of the subject vehicle traveling route and the preceding vehicle traveling route and the traveling route after integration.

DETAILED DESCRIPTION

Hereinafter, the travel support device and methods of the vehicle according to an embodiment of the present invention will be described with reference to the figures. In the present embodiment, the present invention will be described with examples of the travel support device mounted on the vehicle.

FIG. 1 is a diagram showing a configuration of a travel support device 100 of the vehicle according to an embodiment of the present invention. As shown in FIG. 1, The travel support device 100 according to the present embodiment includes a subject vehicle position detection device 110, a map database 120, a vehicle speed sensor 130, a ranging sensor 140, a camera 150, a drive mechanism 170, a controller 180, and a yaw rate sensor 190. These devices are connected to each other via a controller area network (CAN) or other in-vehicle LAN for mutually exchanging information.

The subject vehicle position detection device 110 includes a GPS unit, which detects radio waves transmitted from a plurality of satellite communications by a locator (GPS antenna) to periodically obtain the position information of the subject vehicle, and detects the current position of the subject vehicle based on the acquired position information of the subject vehicle, angle change information acquired from a gyro sensor, and a vehicle speed acquired from a vehicle speed sensor. Alternatively, the subject vehicle position detection device 110 can detect the position of the subject vehicle using a well-known map matching technique.

The mapping data base 120 contains map information. The map information stored by the map database 120 contains information about road shapes at each map coordinate, such as attributes about curves, hills, intersections, interchanges, narrow lines, straight lines, shoulder structures, and merge points, associated with the map coordinate. The map information is a high accuracy map for use in automated vehicle operation control.

The vehicle speed sensor 130 measures a rotational speed of a drive system, such as a drive shaft, and based on this, the vehicle speed sensor 130 detects a traveling speed of the subject vehicle (hereinafter, also referred to as Vehicle speed). Vehicle speed information of the subject vehicle detected by the vehicle speed Sensor 130 is output to the controller 180. The yaw rate sensor 190 is mounted in an appropriate position such as a vehicle interior, detects a yaw rate of the subject vehicle (change speed of the rotation angle in the rotation direction), the detected yaw rate information of the subject vehicle is output to the controller 180.

The ranging sensor 140 detects objects present around the subject vehicle. In addition, the ranging Sensor 140 calculates the relative distances and relative velocities between the subject vehicle and the object. Information of the object detected by the ranging Sensor 140 is transmitted to the controller 180. The range finding Sensor 140 may be a laser radar, a millimeter-wave radar, or the like (such as LRF).

The camera 150 captures roads and objects around the subject vehicle. In this embodiment, the camera 150 captures the front of the subject vehicle. Image information captured by the camera 150 is transmitted to the controller 180. Camera 150 is a camera that captures the front of the subject vehicle and/or the side of the subject vehicle.

The input device 160 is a device operable by a driver. In the present embodiment, the driver can set on/off of the automated operation control by operating the input device 160. In the automated operation control of the vehicle according to this embodiment, when a preceding vehicle exists in front of the subject vehicle, the distance between the subject vehicle and the preceding vehicle is maintained at the distance set by the driver so that the subject vehicle follows the preceding vehicle (the preceding vehicle follow-up control). In addition, when the preceding vehicle does not exist in front of the subject vehicle, speed control is performed to run the subject vehicle at the vehicle speed set by the driver. In the present embodiment, the driver can operate the input device 160 thereby to set a vehicle speed (e.g. a specific speed value) of the subject vehicle in the speed control and a set distance between vehicles (e.g. any of three stages of a short distance, a medium distance, and a long distance) in the control for the distance between vehicles.

The drive mechanism 170 includes an engine and/or a motor (power system), brakes (brake systems) and steering actuators (steering systems) for an automated travel of the subject vehicle, and the like. In the present embodiment, when the automated operation control to be described later is performed, the controller 180 controls the operation of the drive mechanism 170.

The controller 180 is a computer having a processor, including a ROM (Read Only Memory) storing a program for controlling travel of the subject vehicle, a CPU (Central Processing Unit) executing a program stored in the ROM, and a RAM (Random Access Memory) serving as an accessible storage device. A micro processing unit (MPU), a digital signal processor (DSP), an application specific integrated circuit (ASIC), a field programmable gate array (FPGA), or the like can be used as an operation circuit instead of or in addition to the CPU.

The controller 180, by executing the program stored in the ROM by the CPU, performs a subject vehicle traveling route generation function for generating a traveling route of the subject vehicle, a preceding vehicle traveling route generation function for generating a traveling route of the preceding vehicle, an integrated function for integrating the subject vehicle traveling route and the preceding vehicle traveling route, and a running control function (including an automated follow-up function) that controls the travel of the subject vehicle. Hereinafter, each function of the controller 180 is will be described. Incidentally, the controller 180, in addition to the functions described below, has other functions, for example, a estimation/detection function for estimating/detecting a subject vehicle position The controller 180 calculates the subject vehicle traveling route based on the position of the subject vehicle and the map information by the subject vehicle traveling route generation function. The controller 180 estimates the position of the subject vehicle on the map based on the position information of the subject vehicle detected by the vehicle position detecting device 110 and the map information. The controller 180 generates a trajectory of the subject vehicle from a point column of points (Coordinate positions) indicating the estimated position of the subject vehicle. The controller 180 may calculate the subject vehicle traveling route using the capture image captured by the camera 150. For example, the controller 180 detects lanes from the capture images on the side and/or ahead of the subject vehicle. The controller 180 may generate the subject vehicle traveling route by identifying the boundaries of the detected lanes as traveling route boundaries.

The controller 180 generates the preceding vehicle traveling route by the preceding vehicle traveling route generation function. The preceding vehicle traveling trajectory is represented by the preceding vehicle trajectories, a traveling route boundary, and/or a traveling area. The controller 180 uses the capture image of the cameras 150 and/or the detected data of the ranging Sensor 140 to detect the preceding vehicle which travels in front of the subject vehicle. The controller 180 estimates the position of the detected preceding vehicle and generates the trajectory of the preceding vehicle from a point column of the estimated positions. The controller 180 also identifies a shape of the generated preceding vehicle traveling trajectory.

The controller 180 integrates the subject vehicle traveling route and the preceding vehicle traveling trajectory to generate the target traveling route through an integrated function. The target traveling route is a target route when the subject vehicle travels under the automated driving control. The target traveling route is represented by a target traveling trajectory, a target traveling route boundary, and/or a target traveling area. The controller 180 calculates the degrees of reliability of the preceding vehicle traveling route and the subject vehicle traveling route. The degree of reliability of the subject vehicle traveling route is a degree indicating the precision of the generated subject vehicle traveling route. For example, when accuracy of the map information used to generate the subject vehicle traveling route is low, the degree of the reliability of the subject vehicle traveling route generated by a calculation process using the map information is low. The degree of the reliability of the subject vehicle traveling route corresponds to the degree of coincidence of the travel route obtained by a calculation with respect to the actual traveling route. In addition to the accuracy of the generated preceding vehicle traveling route itself, the degree of the reliability of the preceding vehicle traveling route represents the difference between the preceding vehicle traveling route and the subject vehicle traveling route. For example, when the accuracy of the camera is low and recognition accuracy of the preceding vehicle is low, the calculation accuracy of the preceding vehicle traveling trajectory generated based on the detection data of the camera is low. Such accuracy degradation affects the accuracy of the preceding vehicle traveling route itself. For example, when the preceding vehicle changes lanes while the subject vehicle is following the preceding vehicle under the automated operation control, the preceding vehicle travel route deviates from the subject vehicle travel route. When the routes differ, the degree of the reliability of the preceding vehicle traveling trajectory is low. The controller 180 identifies the difference between the subject vehicle traveling route and the preceding vehicle traveling route from the shape of the preceding vehicle traveling route. For example, when the preceding vehicle turns right or left or changes lanes while the subject vehicle is traveling in a linear lane, a shape of the preceding vehicle traveling route is not a straight line. That is, the controller 180 calculates the degree of the reliability of the preceding vehicle traveling route based on the shape of the preceding vehicle traveling route. Method of calculating the degrees of the reliability of the preceding vehicle traveling route and the subject vehicle traveling route will be described later. In the following description, the degree of the reliability of the subject vehicle traveling route is also referred to as "Degree of the first reliability" and the degree of the reliability of the preceding vehicle traveling route is also referred to as "Degree of the second reliability".

The controller 180 calculates an integration ratio for integrating the subject vehicle traveling route and the preceding vehicle traveling route based on the degree of the first reliability and the degree of the second reliability. The integration ratio indicates which of the subject vehicle traveling route and the preceding vehicle traveling route is weighted by a value. The integration ratio corresponds to the weighting of the subject vehicle traveling route and the preceding vehicle traveling route. Then, the controller 180 calculates the target traveling route of the subject vehicle by integrating the subject vehicle traveling route and the preceding vehicle traveling route at the calculated integration ratio.

The controller 180 controls the drive mechanism 170 by the traveling control function, to perform the automated operation control that automatically performs all or a part of the travel of the subject vehicle so that the subject vehicle travels on the target traveling route. For example, in the traveling control function according to the present embodiment, when the preceding vehicle exists in front of the subject vehicle, the operation of the driving mechanism 170, such as an engine or brake, is controlled to perform a vehicle-to-vehicle distance control in which the subject vehicle travels away from the preceding vehicle by the distance which is set by the vehicle-to-vehicle distance setting function. Further, the controller 180 controls the operation of the driving mechanism 170, such as an engine, a brake, and a steering actuator, when the preceding vehicle exists in front of the subject vehicle, so that the distance between the subject vehicle and the preceding vehicle is the distance between the vehicles which is set by the vehicle-to-vehicle distance setting function, and performs the automated follow-up control so that the subject vehicle travels on the traveling trajectory of the preceding vehicle. Further, when the preceding vehicle exists in front of the subject vehicle, the controller 180 performs, by controlling the operation of the drive mechanism 170, such as an engine or brake, a speed travelling control in which the subject vehicle travels at a predetermined set speed by drivers. Note that, the automated driving control by the running control function is performed under observing the traffic laws and regulations of each country.

Next, a control process for assisting the running of Vehicle will be described. FIG. 2 is a block diagram showing flows of a control process of the present embodiment. Note that, the traveling control process described below is executed by the controller 180. Further, the traveling control process described below starts when an ignition switch or a power switch is turned on, and is repeatedly performed at a predetermined period (for example, every 10 milliseconds) by the ignition switch or the power switch is turned off.

The following description is based on an exemplary scene in which the automated operation control is input (turned on) by the driver. That is, when the driver turns on the automated operation control via the input device 160, and the preceding vehicle exists in front of the subject vehicle, the automated follow-up control is performed to follow the subject vehicle while the subject vehicle is away from the preceding vehicle by the set distance.

In the step S100, the controller 180 acquires the position information of the subject vehicle detected by the subject vehicle position detection device 110 and acquires the map information from the map database 120. The controller 180 estimates the position of the subject vehicle on the map based on the map information.

In the step S200, the controller 180 acquires the subject vehicle traveling boundary by identifying the traveling route on which the subject vehicle is currently traveling, based on the estimated position of the subject vehicle and the map information. The boundaries correspond to the left and right boundaries (lane boundaries) of the lane on which the subject vehicle is currently traveling. When the high accuracy map contains lane boundary information, the controller 180 may acquire the traveling route boundary from the map database 120. When the high accuracy map does not include the information of the lane boundary, the controller 180 may acquire the lane boundary by image processing of the captured image of the camera 150.

In the step S300, the controller 180 acquires the information of the preceding vehicle by image processing of the captured image of the camera 150. The controller 180 also estimates the position of the preceding vehicle based on information of the preceding vehicle. The controller 180 may acquire information of the preceding vehicle from the detected data of the ranging sensor 140.

In the step S400, the controller 180 calculates the traveling trajectory of the preceding vehicle based on the acquired information of the preceding vehicle. In the step S500, the controller 180 acquires the preceding vehicle traveling boundary by generating a traveling route on which the preceding vehicle is currently traveling, based on the map information and the estimated preceding vehicle position.

In the step S600, the controller 180 calculates the degrees (Degrees of the first and second reliability) of the reliability of the subject vehicle traveling route (the subject vehicle traveling route boundary) and the preceding vehicle traveling route (the preceding vehicle traveling route boundary), calculates the integration ratio based on the calculated degree of reliability, and integrates the subject vehicle traveling route and the preceding vehicle traveling route at the calculated integration ratio. Hereinafter, in explaining the flow included in the control process of the step S600, the traveling boundary included in the traveling route will be described as an example, but the centerline of the lane may be used, for example, instead of the traveling boundary.

Details of the control process of the step S600 will be described with reference to FIG. 3. FIG. 3 is a block diagram for explaining flows of the control process S600.

In the step S610, the controller 180 calculates the degree of the first reliability based on the traveling boundaries of the subject vehicle. In the step S620, the controller 180 calculates the degree of the second reliability based on the traveling boundaries of the preceding vehicle. In a step S630, the controller 180 integrates the subject vehicle traveling boundary and the preceding vehicle traveling boundary based on the subject vehicle traveling boundary, the preceding vehicle traveling boundary, the degree of the first reliability, and the degree of the second reliability. Hereinafter, the control process in each step of the step S610~S630 will be described.

Referring to FIG. 4, the control process of the step S610 will be described. FIG. 4 is a block diagram for explaining flows of a control process S610. The controller 180 calculates a degree of reliability for the high accuracy map in the control process of the step S610. The high accuracy map contains information used to perform the automated traveling control. Depending on the place on the map, the accuracy of the map may vary because the location of the feature, such as the lane boundary, as shown in the high accuracy map, may differ from the location of the actual feature. The controller 180 calculates the degree of the reliability of the map by the following control flows.

In step S611, the controller 180 calculates the variance values of the subject vehicle position based on the position of the subject vehicle estimated in predetermined period and the attitude of the subject vehicle. The controller 180 estimates the position of the subject vehicle at a predetermined period. When the detection accuracy of the subject vehicle position detection device 110 is high, the estimated vehicle positions are aligned along the trajectory of the subject vehicle. On the other hand, when the detection accuracy of the subject vehicle position detection device 110 is low, the estimated subject vehicle position extends with respect to the traveling trajectory. The controller 180 calculates this expansion as a dispersion value of the subject vehicle position. That is, the higher the dispersion value of the subject vehicle position is, the lower the estimation accuracy of the subject vehicle position is. The controller 180 also uses the detected data of the yaw rate sensor 190 to detect the attitude of the subject vehicle. For example, when the subject vehicle is unsteady, the estimated car position is dispersed. Therefore, in order to increase a correlation between the detection accuracy of the subject vehicle position detection device 110 and the dispersion value of the subject vehicle position, the controller 180 corrects the dispersion value of the subject vehicle position according to the attitude of the subject vehicle.

The controller 180 refers to a map showing a correlation relationship between the dispersion value of the subject vehicle position and the degree of the first reliability, and calculates the degree of the first reliability corresponding to the calculated dispersion value. FIG. 5 is a graph showing the relationship between the dispersion values of the subject vehicle position and the degree of the first reliability. As shown in FIG. 5, there is a correlation between the dispersion value of the subject vehicle position and the degree of the first reliability. The greater the dispersion value of the subject vehicle position is, the lower the degree of the first reliability of the subject vehicle position is.

In the step S612, the controller 180 calculates a degree of map accuracy based on the detected value detected the onboard sensor such as the camera 150 and Map information. The controller 180 identifies, from the map information, the map shape of the vicinity portions of the subject vehicle. A map shape is identified, for example, from a road shape. The controller 180 identifies the object corresponding to the map shape from the capture image of the camera 150. The controller 180 identifies the road shape by detecting lanes, guardrails, white lines indicative of intersections, and the like from the imaging images. For example, inside an intersection, where no boundaries are specified, the degree of accuracy of the high accuracy maps is low. Then, the controller 180, when it is possible to identify the road shape using the onboard sensor, calculates the degree of coincidence between the road shape identified from the detection data of the onboard sensor and the map shape identified from the map information. Then, the controller 180 calculates the degree of the map accuracy so that the higher the degree of coincidence is, the higher the value indicating the map accuracy is.

The controller 180 refers to a map showing the correlation between the degrees of the map accuracy and the first reliability to calculate the degree of the first reliability corresponding to the calculated degree of the map accuracy. FIG. 6 is a graph showing the relationship between the degrees of map accuracy and the first reliability. As shown in FIG. 6, there is a correlation between the degrees of the map accuracy and the first reliability. The lower the degree of the map accuracy is, the lower degree of the first reliability of the subject vehicle position is.

In the step S613, the controller 180 selects the lower degree of the first reliability any lower of the degree of the first reliability calculated based on the dispersion value of the subject vehicle and the degree of the first reliability calculated based on the map accuracy (select low).

In step S614, the controller 180 performs a rate-limiting process to the selected degree of the first reliability. In the controller 180, the upper limit change amount is set in advance. The controller 180 calculates the change amount between the degrees of the first reliability calculated in this period and the previous period. The controller 180 compares the calculated change amount and the upper limit change amount. When the calculated change amount is equal to or greater than the upper limit change amount, the amount obtained by limiting the change amount to the upper limit change amount (the amount obtained by adding the upper limit change amount to the degree of the first reliability calculated in the previous period) is the degree of the first reliability. On the other hand, when the calculated change amount is less than the upper limit change value, the controller 180 outputs the degree of the first confidence value selected in the control process S613 steps, as it is.

Next, with reference to FIG. 7, a control process of the step S620 will be described. FIG. 7 is a block diagram for explaining flows of a control process S620 steps. In the control process of the step S620, the controller 180 calculates the degree of the reliability (hereinafter, also referred to as the degree of the single reliability) of the generated preceding vehicle traveling route boundary itself and the degree of the reliability (hereinafter, also referred to as the degree of the comparative reliability) which is calculated by comparing the subject vehicle traveling route boundary with the preceding vehicle traveling route boundary. Then, the controller 180 calculates the degree of the second reliability based on the degree of the single reliability and the degree of the comparative reliability. The degree of the single reliability is represented by the degree of sensor reliability and the degree of the trajectory reliability, and the degree of the comparative reliability is represented by the degrees of the curvature reliability and the lateral position reliability. Note that the degree of the single reliability may include at least one of the degree of sensor reliability and the degree of the trajectory reliability, and the degree of the comparative reliability may include at least one of the degrees of the curvature reliability and lateral position reliability. Hereinafter, a specific control flow will be described.

In the step S621, the controller 180 calculates the degree of sensor reliability based on the detected data of the onboard Sensor such as a camera. The degree of sensor reliability corresponds to stability of detecting sensor. For example, if the preceding vehicle cannot be detected from the image captured by the camera due to disturbances, the degree of sensor reliability will be low.

In the step S622, the controller 180 calculates the degree of the trajectory reliability of the preceding vehicle traveling trajectory. The degree of the trajectory reliability is an evaluation value that indicates whether or not the preceding vehicle traveling route boundary calculated by the operation processing of the step S400 and the step S500 is a route suitable for Target traveling route boundary operation, and is determined by the length of the preceding vehicle traveling trajectory. For example, if the preceding vehicle enters the front of the subject vehicle at cut-in and exits from the front of the subject vehicle in a short time, the preceding vehicle traveling trajectory will be shortened. In such cases, the degree of the trajectory reliability is low. The controller 180 calculates the degree of the trajectory reliability so that the shorter preceding vehicle traveling trajectory, the lower the degree of the trajectory reliability.

In the step S623, the controller 180 selects the lower degree of reliability of the degree of sensor reliability and the degree of the trajectory reliability. The selected Reliability is turned the degree of the single reliability.

In the step S624, the controller 180 calculates Difference in the curvature between curvature of the traveling trajectory of the vehicle and curvature of the preceding vehicle traveling trajectory, and calculates the degree of the curvature reliability based on Difference in the curvature. The degree of the curvature reliability is an assessment of the difference in the preceding vehicle traveling trajectory with respect to the trajectory of the vehicle in curvature. When the preceding vehicle and the subject vehicle are driving on the same lane, the boundary between the vehicle traveling route and the preceding vehicle traveling route is close to route other, so the difference between curvature of the subject vehicle traveling route boundary and curvature of the preceding vehicle traveling route boundary is small. On the other hand, if the preceding vehicle changes the lane while the preceding vehicle and the subject vehicle are running on the same lane, the preceding vehicle traveling route boundary will differ from the boundary and Difference in the curvature will increase. The controller 180 calculates the degree of the curvature reliability so that the greater the difference in the curvature is, the lower degree of the curvature reliability is. When the preceding vehicle changes lanes while the subject vehicle is following the preceding vehicle with the automated follow-up function, this lane change appears in the difference in the curvature. When the difference in the curvature is large, lowering the degree of the curvature reliability prevents the subject vehicle target route from becoming the preceding vehicle route for lane changes.

The controller 180 refers to a map showing Correlation between Difference in the curvature and the degree of the curvature reliability and calculates the degree of the curvature reliability corresponding to the computed Difference in the curvature. FIG. 8 is a graph showing a correlation between the difference in the curvature and the degree of the curvature reliability. As shown in FIG. 8, there is a correlation between the difference in the curvature and the degree of the curvature reliability. The larger the difference in the curvature is, the lower the degree of the curvature reliability is. The controller 180 also refers to the map and calculates the degree of the curvature reliability corresponding to the difference in the curvature, depending on the vehicle speed of the subject vehicle.

In the graph of FIG. 8, the solid line graph shows the characteristics when a vehicle speed is small. The dotted line graph shows the characteristics when a vehicle speed is high.

As shown in FIG. 8, the correlation relationship between the difference in the curvature and the degree of the curvature reliability is such that when the difference in the curvature is the same, the greater the vehicle speed is, the lower the degree of the curvature reliability is. For example, if Vehicle speed of the preceding vehicle is large and the preceding vehicle changes the lane, curvature of the preceding vehicle traveling trajectory becomes small. On the other hand, if the preceding vehicle changes the lane while Vehicle speed of the preceding vehicle is small, curvature of the preceding vehicle traveling trajectory increases. In this embodiment, the degree of the comparative reliability is calculated appropriately according to the vehicle speed of the preceding vehicle by changing the correlation between the difference in the curvature and the degree of the curvature reliability according to a vehicle speed.

In step S625, the controller 180 calculates the deviation between the position of the lateral direction of the subject vehicle on the subject vehicle traveling route boundary and the position of the lateral direction of the preceding vehicle position on the preceding vehicle traveling route boundary. The lateral direction is a width direction of the vehicle. The position of the vehicle may be on the traveling route boundary of the traveling route and/or on the centerline of the traveling route. The position of the vehicle may be on one of the traveling route boundaries of the right and left traveling route boundaries. When the preceding vehicle and the subject vehicle are traveling on the same lane, the deviation of the lateral position is small because the boundary between the subject vehicle traveling route boundary and the preceding vehicle traveling route boundary is a close route. On the other hand, when the preceding vehicle changes the lane while the preceding vehicle and the subject vehicle are traveling on the same lane, the preceding vehicle traveling route boundary is a different route from the subject vehicle traveling route boundary and the deviation of the lateral position is large. The controller 180 lowers the lateral position reliability as the lateral deviation is greater. The lateral position reliability is an assessment of the difference in the preceding vehicle traveling route boundary with respect to the subject vehicle boundary in the lateral position.

The controller 180 calculates the degree of lateral direction reliability so that the greater the lateral position deviation is, the lower the lateral position reliability is. When the preceding vehicle changes lanes while the subject vehicle follows the preceding vehicle with automated follow-up function, this lane change is appeared by the deviation in the lateral position. When the lateral position deviation is large, the lateral position reliability is lowered so that the target route of the subject vehicle does not become the trajectory of the preceding vehicle where the lane is changed.

The controller 180 refers to a map showing correlation between the position deviation of the lateral direction (hereinafter also referred to as the lateral position deviation) and the lateral position reliability, and calculates the lateral position reliability corresponding to the calculated lateral position deviation. FIG. 9 is a graph showing the correlation between the lateral position deviation and the lateral position reliability. As shown in FIG. 9, there is a correlation between the lateral position deviation and the degree of the lateral position reliability. The larger the lateral position deviation is, the lower the degree of the lateral position reliability is. The controller 180 also refers to the map and calculates the lateral position reliability corresponding to the lateral position deviation, according to the vehicle speed of the subject vehicle.

In the graph of FIG. 9, the solid line graph shows the characteristics when a vehicle speed is small. The dotted line graphs show the characteristics when a vehicle speed is large. As shown in FIG. 8, the correlation relationship between the lateral position deviation and the lateral position reliability is such when the lateral position deviation is the same, the greater the vehicle speed is, the lower the degree of the lateral position reliability is. For example, when the vehicle speed of the preceding vehicle is large and the preceding vehicle changes the lane, the change amount in the lateral direction of the preceding vehicle traveling trajectory is small. On the other hand, when the preceding vehicle changes lanes while the vehicle speed of the preceding vehicle is small, the change amount in the lateral direction of the preceding vehicle traveling trajectory is large. In this embodiment, the degree of the comparative reliability is calculated appropriately according to vehicle speed of the preceding vehicle by changing the correlation between the lateral position deviation and the lateral position reliability according to a vehicle speed.

In step S626, the controller 180 selects the degree of reliability of any lower of the degree of the curvature reliability and lateral position reliability. The selected reliability is set to the degree of the comparative reliability.

In step S627, the controller 180 selects the lower degree of reliability of any lower of the degree of the single reliability and the comparative reliability. The selected reliability is set to the degree of the second reliability.

In step S628, the controller 180 performs a rate-limiting process to the selected degree of the second reliability. In the controller 180, the upper limit value of the amount of change is set in advance. The controller 180 calculates the change amount between the degrees of the second reliability calculated in the previous period and this period. The controller 180 compares the calculated change amount and the upper limit change amount. When the calculated change amount is equal to or greater than the upper limit change amount, the amount obtained by limiting the change amount to the upper limit change amount (the amount obtained by adding the upper limit change amount to the degree of the second reliability calculated in the previous period) is the degree of the second reliability. On the other hand, when the calculated change amount is less than the upper limit change amount, the controller 180 outputs the degree of the second reliability selected in the control process S627 steps, as it is.

Controller 180, by performing the above control flow, after performing the control process of the step S600, performing the control process of the step S700 shown in FIG. 2.

In step S700, the controller 180 generates a target traveling route based on the degree of the first reliability and the degree of the second reliability. The control process of the target traveling route will be described with reference to FIG. 10.

The controller 180 calculates the integration ratio based on the degree of the first reliability and the degree of the second reliability. Integration ratio is represented as the ratio of the degree of the first reliability to the total reliability, which is obtained by adding the degrees of the first reliability and of the second reliability, and the ratio of the degree of the second reliability to the total reliability. The controller 180 corrects the lateral direction coordinate of the subject vehicle traveling route boundary and the lateral direction coordinate of the preceding vehicle traveling route boundary with the corresponding Integration ratio, to calculate the combined traveling route boundary.

The controller 180 calculates the lateral direction coordinate of the integrated traveling route boundaries using Equation (1) below. As shown in FIG. 10, the traveling direction of the subject vehicle is x-axis and the width direction of the car is y-axis. $y_{i,j}$ indicates y coordinate on the integrated traveling route boundary, $y_{a\_i, j}$ indicates y coordinate on the subject vehicle traveling route boundary, and $y_{b\_i, j}$ indicates y Coordinate on the preceding vehicle traveling route boundary. $R_{a\_i,j}$ indicates the degree of the first reliability, and $R_{b\_i, j}$ indicates the degree of the second reliability. i indicates the order of detection, and j indicates the left and right. The degree of the first reliability and the degree of the second reliability are normalized between 0 and 1.

$$y_{i,j} = \frac{R_{a\_i,j}}{R_{a\_i,j} + R_{b\_i,j}} \times y_{a\_i,j} + \frac{R_{b\_i,j}}{R_{a\_i,j} + R_{b\_i,j}} \times y_{b\_i,j} \quad (1)$$

In the above equation, the coefficients to be multiplied by y Coordinate ($y_{a\_i, j}$) and y Coordinate ($y_{b\_i, j}$) correspond to the integration ratio. For example, when the degree of the first reliability and the degree of the second reliability are both 0.5, the y Coordinate of the integrated traveling route boundary is the midpoint between y coordinate of the subject vehicle traveling route boundary and y coordinate of the preceding vehicle traveling route boundary. When the degree of the first reliability and the degree of the second reliability are compared and the degree of the first reliability is higher than the degree of the second reliability, the y coordinate of the integrated traveling route boundary is closer to the y coordinate of the subject vehicle traveling route boundary than the y coordinate of the preceding vehicle traveling route boundary.

In the example of FIG. 10, from the order of detection (i=1) to the order of detection (i=7), the degrees of the first reliability and the second reliability are both 0.5. Then, after the detection order (i=8), the degree of the second reliability is zero. The y coordinate ($y_{i, j}$) of the post-integration traveling route boundary calculated by the equation (1) is the midpoint between the y Coordinate ($y_{a\_i, j}$) of the subject vehicle traveling route boundary and the y Coordinate ($y_{b\_i, j}$) of the preceding vehicle traveling route boundary from the detection order (i=1) to the detection order (i=7). After the order of detection (i=8), the y coordinate ($y_{i, j}$) of the integrated traveling route boundary matches the y coordinate ($y_{a\_i, j}$) of the subject vehicle traveling route boundary.

The controller 180 may also compute the integration ratio so that the degree of the first reliability is weighted than the degree of the second reliability. Referring to FIGS. 11 and 12, the weighting in the calculation process of the integration ratio and the relationship between the subject vehicle traveling route boundary, the preceding vehicle traveling route boundary, and the traveling route boundary of the post-integration traveling route will be described.

An upper reliability threshold and a lower reliability threshold are set for the degree of the first reliability and the degree of the second reliability, respectively. The upper reliability threshold is set higher than the lower reliability threshold. In the FIG. 11, a state in which the degree of the first reliability is higher than the upper reliability threshold is defined as "high," a state in which the degree of the first reliability is lower than or equal to the higher reliability threshold and higher than the lower reliability threshold, which is below the upper reliability threshold, is defined as "medium," and a state in which the degree of the first reliability is lower than the lower reliability threshold is defined as "low." The same applies to "high", "medium" and "small" for the degree of the second reliability. Incidentally, FIG. 11 corresponds to FIGS. 12(a) to (c).

As shown in FIG. 11, when the degree of the first reliability is at the "high" and the degree of the second reliability is at "high", the integration ratio is set so that a utilization ratio of the subject vehicle traveling route boundary is 100% and a utilization ratio of the preceding vehicle traveling route boundary is 0%. When the degree of the first reliability is at "high" and the degree of the second reliability is at "low," the integration ratio is set so that the utilization ratio of the subject vehicle traveling route boundary is 100% and the utilization ratio of the preceding vehicle traveling route boundary is 0%. That is, when the degree of the first reliability is higher than the upper reliability threshold and the degree of the second reliability is higher than the lower reliability threshold, the controller 180 calculates the integration ratio so that the ratio of the degree of the first reliability is greater than the ratio of the degree of the second reliability.

Figure 12C:
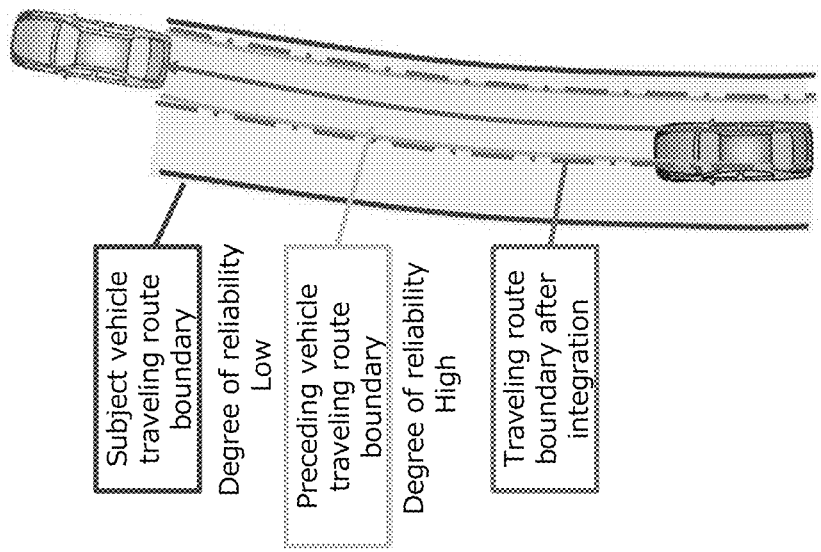
Figure 12B:
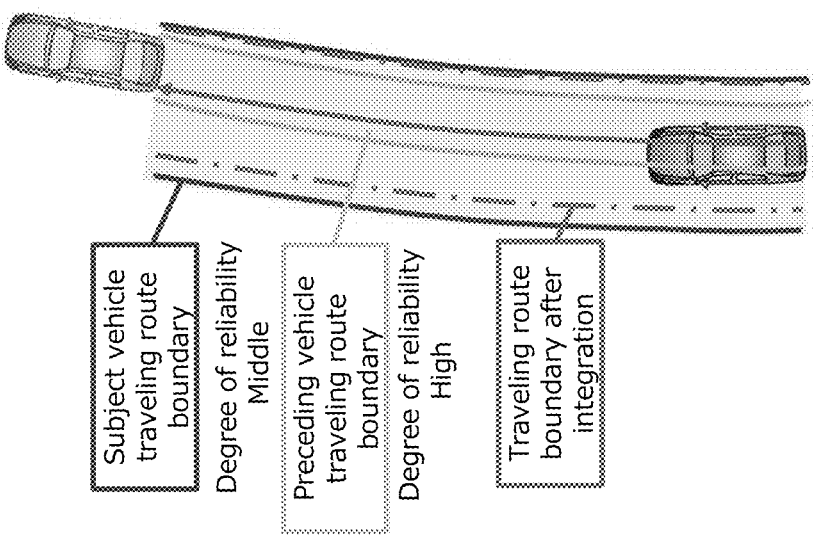
Figure 12A:
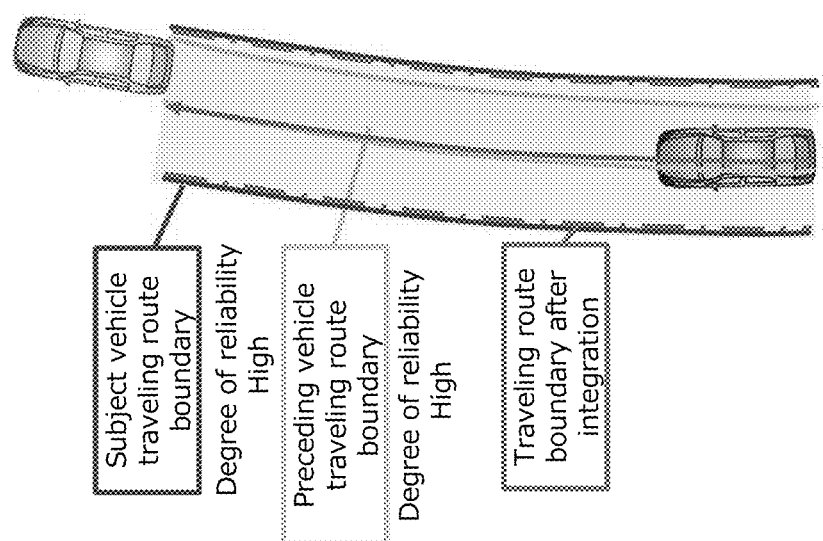

FIG. 12(a) shows the traveling route boundary when the degree of the first reliability is at "high" and the degree of the second reliability is at "high". As shown in FIG. 12(a), the traveling route boundary after integration coincides with the subject vehicle traveling route boundary. When the degree of the reliability of the subject vehicle traveling route is at "high", the controller increase the utilization ratio of the subject vehicle traveling route regardless of the degree of the reliability of the preceding vehicle traveling route. This allows the subject vehicle to travel stably in the subject vehicle lane without unsteadiness in the preceding vehicle lane or following the steady position deviation.

As shown in FIG. 11, when the degree of the first reliability is at "middle" and the degree of the second reliability is at "high", the integration ratio is set so that the utilization ratio of the subject vehicle traveling route boundary is 50% and the utilization ratio of the preceding vehicle traveling route boundary is 50%. When the degree of the first reliability is at "middle" and the degree of the second reliability is at "low", the integration ratio is set so that the utilization ratio of the subject vehicle traveling route boundary is 100% and the utilization ratio of the preceding vehicle traveling route boundary is 0%. That is, when the degree of the first reliability is lower than or equal to the lower reliability threshold, the controller 180 calculates the integration ratio to include the degree of the first reliability.

FIG. 12(b) shows the traveling route boundaries when the degree of the first reliability is at "high" and the degree of the second reliability is at "medium". As shown in FIG. 12(b), after the integration, the traveling route boundary shifts slightly toward the preceding vehicle traveling route boundary with respect to the position of the subject vehicle traveling route boundary. In other words, when the degree of the first reliability is lower than or equal to the lower reliability threshold, it can travel stably in the subject vehicle lane by utilizing the subject vehicle traveling route.

As shown in FIG. 11, when the degree of the first reliability is at "low" and the degree of the second reliability is at "high," the integration ratio is set so that the utilization ratio of the subject vehicle traveling route boundary is 0% and the utilization ratio of the preceding vehicle traveling route boundary is 100%. When the degree of the first reliability is at "low" and the degree of the second reliability is at "low," the integration ratio is set so that the utilization ratio of the subject vehicle traveling route boundary is 0% and the utilization ratio of the preceding vehicle traveling route boundary is 0%. That is, when the degree of the first reliability is less than the lower reliability threshold and the degree of the second reliability is equal to or greater than the upper reliability threshold, the controller 180 calculates the integration ratio so that the ratio of the degree of the second reliability is greater than the ratio of the degree of the first reliability.

FIG. 12(c) shows the traveling route boundaries when the degree of the first reliability is at "low" and the degree of the second reliability is at "high". As shown in FIG. 12(c), the integrated traveling route boundary coincides with the preceding vehicle traveling route boundary. In a state in which the degree of the reliability of the subject vehicle traveling route is low, the controller 180 increases the utilization ratio of the preceding vehicle traveling route when the degree of reliability of the preceding vehicle traveling route is high. This allows the subject vehicle to travel stably in the lane.

Then, in the step S700, the controller 180 generates a target traveling route by calculating a target traveling route boundary based on the map information and the integrated traveling route boundary.

In a step S800, the controller 180 controls the operation of the drive 170 such that the subject vehicle travels on the target traveling route.

As described above, in the device according to this embodiment, the subject vehicle traveling route is generated based on the estimated subject vehicle position and the map information, the degree of the first reliability indicating reliability of the subject vehicle traveling route is calculated, the preceding vehicle is detected, the preceding vehicle traveling route is generated, and the degree of the second reliability indicating reliability of the preceding vehicle traveling route is calculated based on the shape of the preceding vehicle traveling route. Then, based on the degrees of the first reliability and the second reliability, the integration ratio for integrating the subject vehicle traveling route and the preceding vehicle traveling route is calculated, and by integrating the subject vehicle traveling route and the preceding vehicle traveling route at the integration ratio, the target traveling route of the subject vehicle is calculated, and the subject vehicle is controlled based on the target traveling route. Thus, for example, when the detection accuracy of the preceding vehicle is low or when the traveling route of the subject vehicle differs from the traveling route of the preceding vehicle, it is possible to prevent the subject vehicle from unsteadiness caused by following the trajectory of the preceding vehicle by the subject vehicle.

In the present embodiment, the lower the degree of the estimation accuracy of the subject vehicle position is, the lower the degree of the first reliability is. When the estimation accuracy of the position is lowered, there is a possibility that a steady deviation occurs in the lateral position and the attitude angle of the subject vehicle. In this embodiment, in order to lower the degree of the first reliability when the degree of the estimation accuracy of the subject vehicle position is low, it is possible to suppress the steady deviation and unsteadiness of the subject vehicle.

In the present embodiment, the lower the degree of the map accuracy represented by the map information is, the lower the degree of the first reliability is. For example, where the traveling route boundary is not determined due to white lines, curbs, etc. (e.g., inside an intersection), or where the actual shape may differ from the map due to road construction, etc., the degree of map accuracy is low. In the present embodiment, it is possible to suppress unsteadiness of the subject vehicle generated by the decrease in the degree of the map accuracy.

In this embodiment, the degrees of the estimation accuracy of the subject vehicle position and the map accuracy are calculated, and the degree of the first reliability is calculated based on any lower one of degrees of the detection accuracy and the map accuracy. It is possible to suppress unsteadiness of the subject vehicle when either the degree of the estimation accuracy of the subject vehicle or the degree of the map accuracy is lowered.

In this embodiment, the degree of the single reliability of the preceding vehicle traveling route is calculated using the preceding vehicle detection data detected by the sensor, the subject vehicle traveling route and the preceding vehicle traveling route are compared to calculate the degree of the comparative reliability, and the degree of the second reliability is calculated based on the degrees of the single reliability and the comparative reliability. By using both the preceding vehicle detection status and the shape of the traveling route for calculating the degree of the second reliability, it is possible to prevent the subject vehicle from unsteadiness caused by following the preceding vehicle by the subject vehicle when the degree of the detection accuracy of the preceding vehicle is low or the traveling route of the subject vehicle differs from that of the preceding vehicle.

In this embodiment, the degree of sensor reliability is calculated by evaluating stability of the sensor detection, the preceding vehicle traveling trajectory contained in the preceding vehicle traveling route is generated by using the sensor detection data, the degree of the trajectory reliability determined by the length of the preceding vehicle traveling trajectory is calculated, and the degree of the single reliability is calculated based on the degrees of the sensor reliability and the trajectory reliability. When the degree of the detection accuracy of the preceding vehicle is low, the traveling trajectory of the preceding vehicle is often disturbed. However, in this embodiment, by calculating the degree of the second reliability based on the degree of the trajectory reliability, it is possible to prevent the subject vehicle from unsteadiness caused by following the trajectory of the preceding vehicle by the subject vehicle.

In the present embodiment, the shorter the length of the preceding vehicle traveling trajectory is, the lower the degree of the trajectory reliability is. This prevents the subject vehicle from unsteadiness caused by following the changing lanes of the preceding vehicle by the subject vehicle when the length of the preceding vehicle traveling trajectory is short and the subject vehicle cannot recognize the preceding vehicle route correctly.

In the present embodiment, the degree of the single reliability is calculated based on any lower one of the degree of the reliability of the sensor reliability and the degree of the trajectory reliability. As a result, it is possible to prevent the subject vehicle from unsteadiness when the degree of the detection accuracy is low or the length of the traveling trajectory of the preceding vehicle is short.

In the present embodiment, the difference in the curvature between curvature of the subject vehicle traveling route and curvature of the preceding vehicle traveling route is calculated, and the larger the difference in the curvature is, the lower the degree of the comparative reliability is. This prevents the subject vehicle from unsteadiness caused by following the preceding vehicle by the subject vehicle when the preceding vehicle changes lanes (particularly when the low-speed preceding vehicle changes lanes).

In the present embodiment, the degree of the comparative reliability is calculated based on the vehicle speed of the subject vehicle and the difference in the curvature, using the correlation relationship that the higher the vehicle speed of the subject vehicle is, the lower the degree of the comparative reliability is, when the differences in the curvature is the same. Thereby, the calculation reference of the reliability of the preceding vehicle traveling route can be changed according to the vehicle speed. As a result, the route change of the preceding vehicle can be appropriately determined according to the vehicle speed size of the preceding vehicle, and it is possible to prevent the subject vehicle from unsteadiness caused by following the preceding vehicle by the subject vehicle In this embodiment, the deviation between the lateral position of the subject vehicle on the subject vehicle traveling route and the lateral position of the preceding vehicle on the preceding vehicle traveling route is calculated. The greater the deviation is, the lower the degree of the comparative reliability is. Thus, when the deviation between the lateral positions of the preceding vehicle traveling route and the subject vehicle traveling route is large, it is possible to prevent the subject vehicle from unsteadiness caused by following the preceding vehicle by the subject vehicle.

In the present embodiment, the difference in the curvature between the curvature of the subject vehicle traveling route and the curvature of the preceding vehicle traveling route is calculated, the degree of the curvature reliability is calculated based on the correlation between the degree of the reliability of the preceding vehicle traveling route and the difference in the curvature, the deviation between the lateral position of the subject vehicle on the subject vehicle traveling route and the lateral position of the preceding vehicle on the preceding vehicle traveling route is calculated, the degree of the lateral reliability is calculated based on the correlation between the deviation and the amount of the reliability of the preceding vehicle traveling route, and the degree of the second reliability is calculated based on any lower degree of the reliability of the degree of the curvature reliability and the degree of lateral reliability. Therefore, it is possible to recognize changes in the preceding vehicle traveling route in the entire vehicle speed range, and prevents the subject vehicle from unsteadiness caused by following the preceding vehicle by the subject vehicle.

In the present embodiment, the degree of the second reliability is calculated based on any lower degree of reliability of the degree of the single reliability and the degree of the comparative reliability. Thus, it is prevents the subject vehicle from unsteadiness when either the degree of the preceding vehicle detection accuracy is lowered or the traveling route of the preceding vehicle is changed.

In this embodiment, the lateral direction coordinate of the subject vehicle on the subject vehicle traveling route and the lateral coordinate of the preceding vehicle on the preceding vehicle traveling route are estimated, and the target traveling route is calculated by integrating the coordinates of the subject vehicle and the preceding vehicle at the integration ratio. When the target traveling route is switched by selecting the subject vehicle traveling route or the preceding vehicle traveling route, the subject vehicle behavior may change suddenly. In the present embodiment, the target traveling route changes continuously, it is possible to prevent sudden changes in the behavior of the vehicle.

In the present embodiment, when the degrees of the first reliability and the second reliability are higher than the predetermined reliability threshold, the target traveling route is calculated so that the ratio of the subject vehicle traveling route is greater than that of the preceding vehicle traveling route. Thus, when the degree of the reliability of the preceding vehicle traveling route is high and the degree of the reliability of the subject vehicle traveling route is high, by increasing the utilization ratio of the subject vehicle traveling route, the subject vehicle can travel stably in the subject vehicle lane without unsteadiness of the subject vehicle on the preceding vehicle traveling lane or following under a constant deviation.

In the present embodiment, when the degree of the first reliability is higher than the predetermined reliability threshold and the degree of the second reliability is lower than the predetermined reliability threshold, the target traveling route is calculated so that the ratio of the subject vehicle traveling route is greater than that of the preceding vehicle traveling route. Thus, when the degree of the reliability of the subject vehicle traveling route is high, and the degree of the reliability of the preceding vehicle traveling route is low, the subject vehicle can travel stably in the subject vehicle traveling route by utilizing the subject vehicle traveling route.

In the present embodiment, when the degree of the first reliability is lower than the predetermined reliability threshold and the degree of the second reliability is higher than the predetermined reliability threshold, the target traveling route is calculated so that the ratio of the preceding vehicle traveling route is greater than that of the subject vehicle traveling route. Thus, when the degree of the reliability of the subject vehicle traveling route is low and the degree of the reliability of the preceding vehicle traveling route is high, it can travel stably in the subject traveling lane by utilizing the preceding vehicle traveling route.

In the present embodiment, when calculating the degree of the first reliability, the degree of the first reliability is calculated by calculating the degree of the reliability based on different elements such as the dispersion value of the subject vehicle position and map accuracy, and then taking the select low for the calculated value. However, the select low is not necessarily required. For example, the average values of various reliability calculated by different elements may be calculated as the degree of the first reliability. For the degree of the second reliability, similarly, it is not necessary to take a select low of various reliability calculated by different elements, it may be an average value.

In addition, all Reliability or a part of Reliability may be extracted from various Reliability calculated by different elements, and Integration ratio may be calculated based on the extracted Reliability. For example, to the sum of the extracted Reliability, by calculating the ratio of each reliability, it may be calculated Integration ratio.

The traveling trajectory used for control of traveling the vehicle may be calculated stepwise to calculate the target traveling trajectory of the subject vehicle after setting the target traveling route boundary or the target traveling area. As a result, the subject vehicle trajectory can be calculated after calculating the area where the subject vehicle can travel using the preceding vehicle data. Therefore, it is possible to calculate the appropriate traveling trajectory suited to the traveling environment within the traveling route boundaries or traveling area of the subject vehicle while suppressing unsteadiness caused by following the preceding vehicle.

For example, the controller 180 generates the preceding vehicle traveling route by means of the preceding vehicle traveling route generation function. Then, the controller 180 sets the route along the generated preceding vehicle traveling route as the target traveling route of the subject vehicle, and calculates the target traveling route boundary or the target traveling area from the set target traveling route. The controller 180 calculates the target traveling trajectory based on the calculated target traveling route boundary or target traveling area, and controls the subject vehicle along the calculated target traveling trajectory. Thus, it is possible to calculate the target traveling trajectory in accordance with the actual road environment within the road boundary or the traveling area. Specifically, since the trajectory is drawn arbitrarily in the traveling route boundary or the traveling area, it is possible to calculate the traveling trajectory so as to suppress unsteadiness caused by the preceding vehicle while, for example, suppressing the uncomfortable feeling to the occupant.

In the present embodiment, when calculating the preceding vehicle traveling route, the detection data of the onboard sensor such as a camera is used, for example, using vehicle-to-vehicle communication or road-to-vehicle communication to acquire the information of the preceding vehicle, based on the acquired information, the preceding vehicle traveling route may be calculated. The subject vehicle traveling route may also be calculated based on the data obtained by using vehicle-to-vehicle communication or road-to-vehicle communication.

Note that the preceding vehicle is not limited to a vehicle immediately before the subject vehicle, but may be the preceding vehicle two or more vehicles ahead of the subject vehicle. When the onboard sensor cannot acquire the information from two or more preceding vehicle devices, it is sufficient to acquire the required data using vehicle-to-vehicle communication or road-to-vehicle communication.

EXPLANATIONS OF LETTERS OR NUMERALS

100 . . . Travel support device
110 . . . Subject vehicle position detection device
120 . . . Map database
130 . . . Vehicle speed sensor
140 . . . Ranging sensor
150 . . . Camera
160 . . . Input device
170 . . . Drive mechanism
180 . . . Controller
190 . . . Yaw rate sensor

The invention claimed is:

1. A travel support method for a vehicle to be executed by a processor, comprising:
estimating a position of a subject vehicle;
acquiring map information from a database;
generating a subject vehicle traveling route on which the subject vehicle travels, based on the estimated position of the subject vehicle and the map information;
calculating a degree of first reliability indicating reliability of the subject vehicle traveling route;
detecting a preceding vehicle traveling ahead of the subject vehicle;
generating a preceding vehicle traveling route on which the preceding vehicle travels;
calculating a degree of second reliability indicating reliability of the preceding vehicle traveling route, based on a shape of the preceding vehicle traveling route;
calculating, based on the degree of the first reliability and the degree of the second reliability, an integration ratio for weighting the subject vehicle traveling route and the preceding vehicle traveling route;
calculating a target traveling route of the subject vehicle using the calculated integration ratio so that a boundary of the target traveling route of the subject vehicle is between a boundary of the subject vehicle traveling route and a boundary of the preceding vehicle traveling route; and controlling the subject vehicle based on the target traveling route.

2. The travel support method according to claim 1, wherein the lower a degree of estimation accuracy of the position of the subject vehicle is, the lower the degree of the first reliability is.

3. The travel support method according to claim 1 wherein the lower a degree of map accuracy of a map represented by the map information is, the lower the degree of the first reliability is.

4. The travel support method according to claim 1, comprising:
calculating a degree of estimation accuracy of the position of the subject vehicle and a degree of map accuracy of a map represented by the map information respectively,
wherein the degree of the first reliability is calculated based on the accuracy of the lower of the degree of the estimation accuracy and the degree of the map accuracy.

5. The travel support method according to claim 1, comprising:
calculating a degree of single reliability of the preceding vehicle traveling route using data of the preceding vehicle detected by a sensor; and
compare the subject vehicle traveling route with the preceding vehicle traveling route to calculate a degree of comparative reliability;
wherein the degree of the second reliability is calculated based on the degree of the single reliability and the degree of the comparative reliability.

6. The travel support method according to claim 5, comprising
calculating a degree of sensor reliability indicating reliability of the sensor by evaluating stability of detection of sensor;
generating a preceding vehicle traveling trajectory included in the preceding vehicle traveling route using data detected by the sensor; and
calculating a degree of trajectory reliability determined by a length of the preceding vehicle traveling trajectory;
wherein the degree of the single reliability is calculated based on the degree of the sensor reliability and the degree of the trajectory reliability.

7. The travel support method according to claim 6, wherein the shorter the length of the preceding vehicle traveling trajectory is, the lower the degree of the trajectory reliability is.

8. The travel support method according to claim 6, wherein the degree of the single reliability is calculated based on the degree of reliability of the lower of the degree of the sensor reliability and the degree of the trajectory reliability.

9. The travel support method according to claim 5, comprising
calculating a difference in a curvature between a curvature of the subject vehicle traveling route and a curvature of the preceding vehicle traveling route,
wherein the larger the difference in curvature is, the lower the degree of comparative reliability is.

10. The travel support method according to claim 9, wherein the degree of comparative reliability is calculated based on a vehicle speed of the subject vehicle and the difference in the curvature using a correlation relationship in which the larger the vehicle speed of the subject vehicle is, the lower the degree of the comparative reliability is.

11. The travel support method according to claim 5, comprising
calculating a deviation between a lateral position of the subject vehicle on the subject vehicle traveling route and a lateral position of the preceding vehicle on the preceding vehicle traveling route,
wherein the larger the deviation is, the lower the degree of the comparative reliability is.

12. The travel support method according to claim 5, comprising:
calculating a difference in a curvature between a curvature of the subject vehicle traveling route and a curvature of the preceding vehicle traveling route;
calculating a degree of curvature reliability indicating the degree of the second reliability based on a correlation between the difference in the curvature and the degree of reliability of the preceding vehicle traveling route;
calculating a deviation between a lateral position of the subject vehicle on the subject vehicle traveling route and a lateral position of the preceding vehicle on the preceding vehicle traveling route; and
calculating a degree of lateral reliability indicating the degree of the second reliability based on a correlation between the deviation and the degree of the reliability of the preceding vehicle traveling route,
wherein the degree of the second reliability is calculated based on the degree of reliability of the lower of the degree of the curvature reliability and the degree of the lateral reliability.

13. The travel support method according to claim 5, wherein the degree of the second reliability is calculated based on the degree of reliability of the lower of the degree of the single reliability and the degree of the comparative reliability.

14. The travel support method according to claim 1, comprising
estimating a lateral coordinate of the subject vehicle on the subject vehicle travelling route and a lateral coordinate of the preceding vehicle on the preceding vehicle traveling route respectively;
wherein the target traveling route is calculated by integrating the lateral coordinate of the subject vehicle and the lateral coordinate of the preceding vehicle at the integration ratio.

15. The travel support method according to claim 1, wherein when the degrees of the first reliability and the second reliability are higher than a predetermined reliability threshold, the integration ratio is calculated so that an utilization ratio of the subject vehicle traveling route is larger than an utilization ratio of the preceding vehicle traveling route.

16. The travel support method according to claim 1, wherein, when the degree of the first reliability is higher than a predetermined reliability threshold and the degree of the second reliability is lower than the predetermined reliability threshold, the integration ratio is calculated so that an utilization ratio of the subject vehicle traveling route is larger than an utilization ratio of the preceding vehicle traveling route.

17. The travel support method according to claim 1, wherein when the degree of the first reliability is lower than a predetermined reliability threshold and the degree of the second reliability is higher than the predetermined reliability threshold, the integration ratio is calculated so that an utilization ratio of the preceding vehicle traveling route is larger than an utilization ratio of the subject vehicle traveling route.

18. The travel support method according to claim 1, comprising:
    calculating a target traveling route boundary from the target traveling route of the subject vehicle; and
    calculating a target traveling trajectory based on the target traveling route boundary to control the subject vehicle.

19. The travel support method according to claim 1, comprising:
    calculating a target traveling route area from the target traveling route of the subject vehicle; and
    calculating a target traveling trajectory based on the target traveling route area to control the subject vehicle.

20. A travel support device comprising a processor, wherein the processor configured to:
    estimate a position of a subject vehicle;
    acquire map information from a database;
    generate a subject vehicle traveling route on which the subject vehicle travels, based on the estimated position of the subject vehicle and the map information;
    calculate a degree of first reliability indicating reliability of the subject vehicle traveling route;
    detect a preceding vehicle traveling ahead of the subject vehicle;
    generate a preceding vehicle traveling route on which the preceding vehicle travels;
    calculate a degree of second reliability indicating reliability of the preceding vehicle traveling route, based on a shape of the preceding vehicle traveling route;
    calculate, based on the degree of the first reliability and the degree of the second reliability, an integration ratio for weighting the subject vehicle traveling route and the preceding vehicle traveling route;
    calculate a target traveling route of the subject vehicle using the calculated integration ratio so that a boundary of the target traveling route of the subject vehicle is between a boundary of the subject vehicle traveling route and a boundary of the preceding vehicle traveling route; and
    control the subject vehicle based on the target traveling route.

\* \* \* \* \*